July 22, 1924.
S. WISE
1,501,934
STEERING WHEEL LOCK
Filed July 19, 1922
2 Sheets-Sheet 1
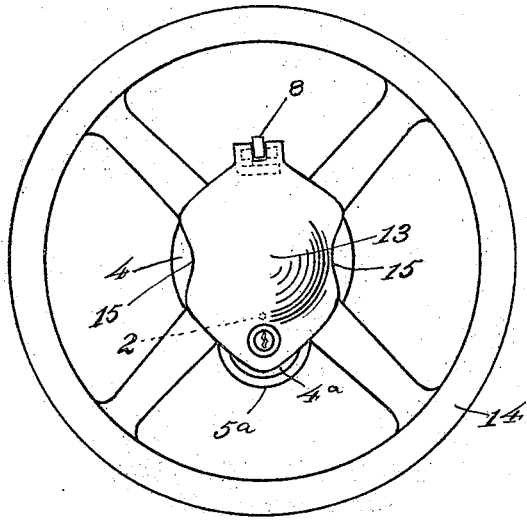
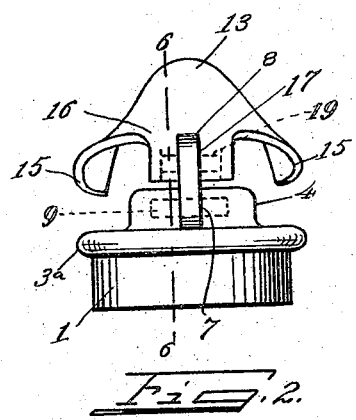
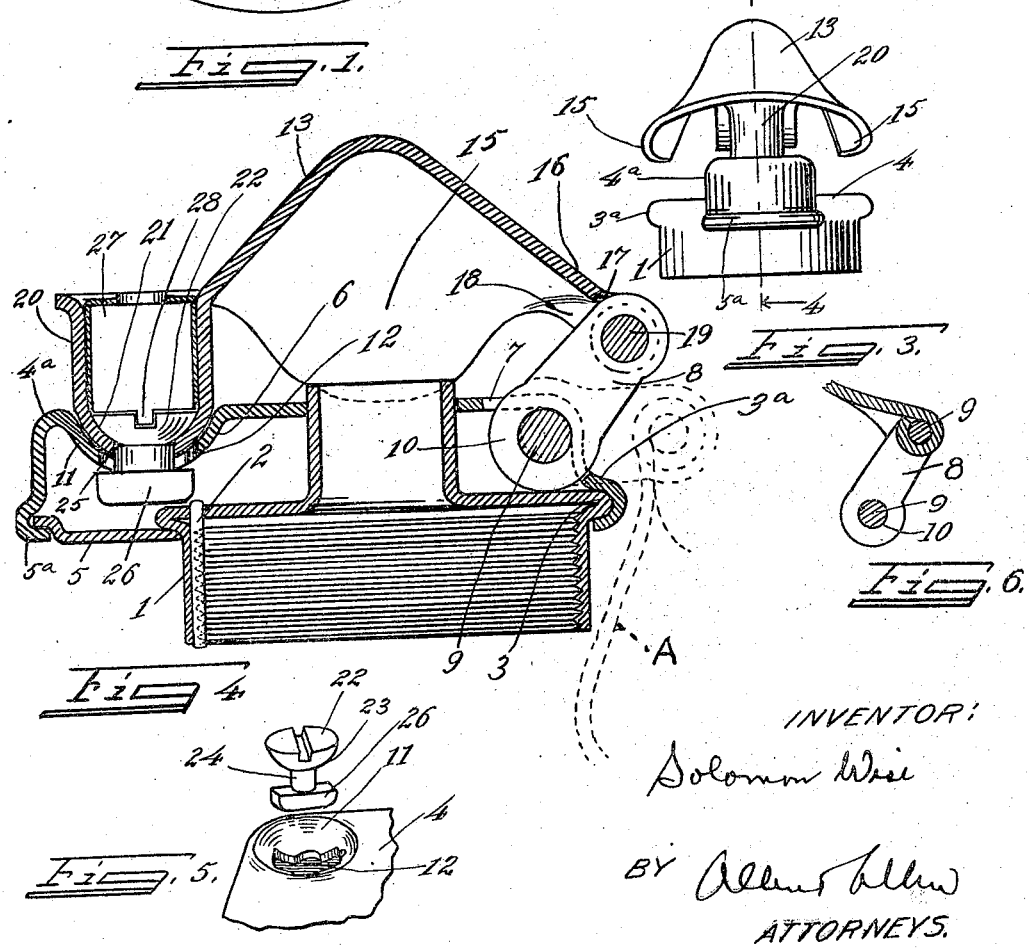
INVENTOR:
Solomon Wise
BY Allen & Allen
ATTORNEYS.

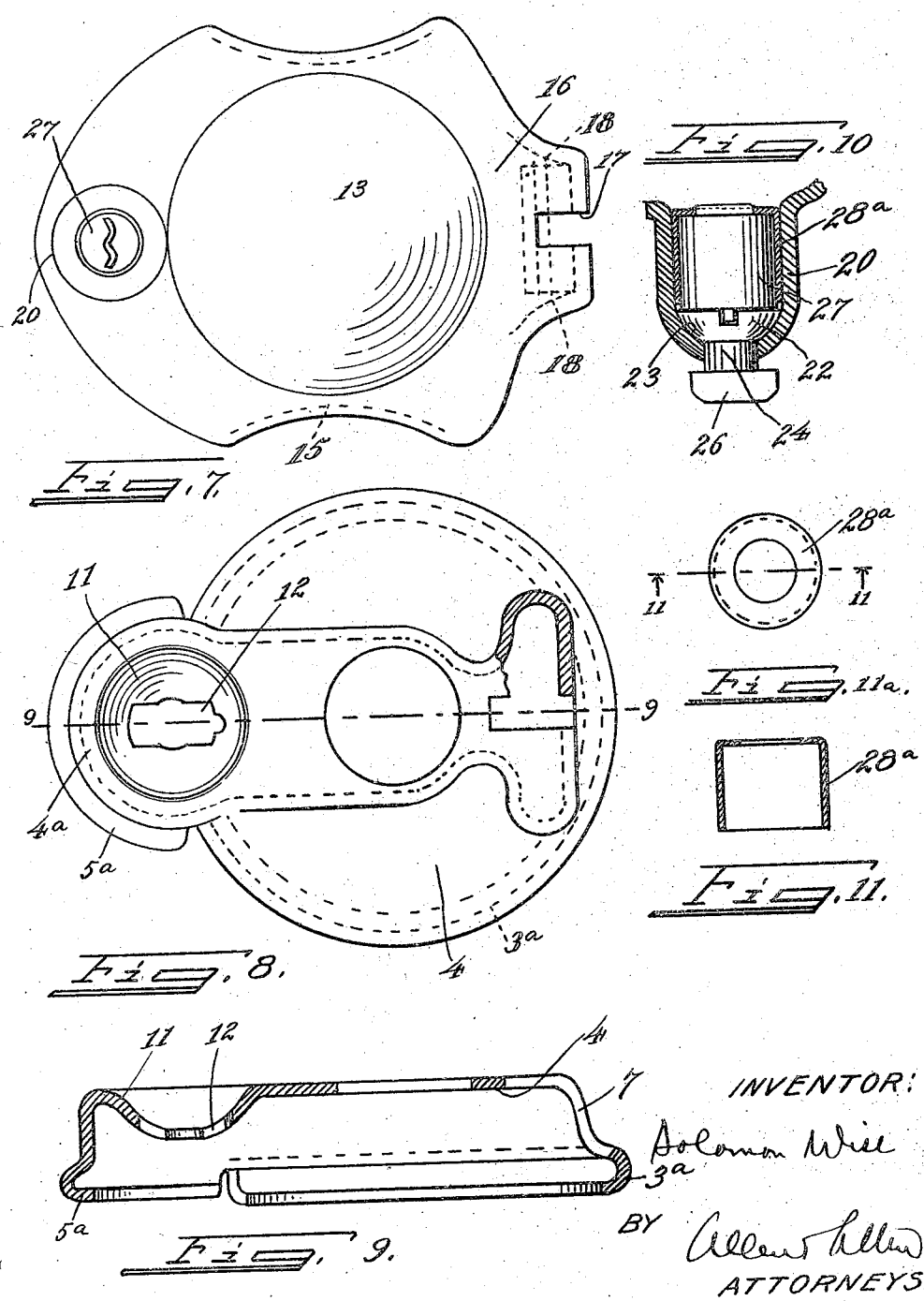

Patented July 22, 1924.

1,501,934

UNITED STATES PATENT OFFICE.

SOLOMON WISE, OF CINCINNATI, OHIO.

STEERING-WHEEL LOCK.

Application filed July 19, 1922. Serial No. 575,925.

*To all whom it may concern:*

Be it known that I, SOLOMON WISE, a citizen of the United States, and a resident of Cincinnati, in the county of Hamilton and State of Ohio, have invented certain new and useful Improvements in Steering-Wheel Locks, of which the following is a full, clear, and exact description, reference being had to the accompanying drawings, forming part of this specification.

My invention relates to steering wheel locks which hold the steering wheel fast against revolution for purposes of preventing the vehicle being steered by means of the wheels by an unauthorized person.

In devices of this character the ingenuity of automobile thieves has so increased that many of the wheel locks formerly accepted as a safeguard against theft have proven unsafe. The reason for this is that with properly directed blows, the use of a hack saw and large pipe wrenches and pry bars, most of the steering wheel locks can be broken or released, or in the case of the loose wheel type of lock, the wheel can be jammed by distorting it. In Ford automobiles having a gear case at the top of the steering column it is also possible in most fast wheel locks or loose wheel locks to remove the gear case cap and steer the vehicle with a large Stillson wrench.

It is the object of my invention to provide a wheel lock of the type noted above, in which, in the first place, the engagement of the lock member is so close to the hub of the steering wheel that removal of spokes cannot affect the lock engagement. It is also my object to prevent removal of the steering wheel or the gear case cap.

It is my object to provide a lock in which the bolt cannot be sheared or bent away, thereby releasing the lock short of a blow which would demolish a piece of heavy case hardened steel.

It is my object to permit removal of the lock when it is open by unscrewing the gear case cap, but to prevent any unscrewing when the lock is closed.

It is also my object to provide a lock which is a pressed steel proposition throughout and can be made inexpensively and very strong, so as to sell for a reasonable price.

The lock to be described has been listed by the Underwriters' Laboratories at Chicago, Illinois, and has withstood very severe tests, but it should be understood that the illustrated showing is merely a preferred form of structure, in which details could be changed without departing from the spirit of the invention involved.

I accomplish the various objects above named and other advantages to be noted by that certain construction and arrangement of parts to be hereinafter more specifically pointed out by means of the illustrative mechanism shown in the drawings and the novelty inherent therein duly claimed.

In the drawings,

Figure 1 is a top plan view of the lock in closed or locked position.

Figure 2 is a side elevation of the lock by itself taken from the hinged side.

Figure 3 is a like view of the lock by itself taken from the lock bolt side.

Figure 4 is a section on the line 4—4 of Figure 3.

Figure 5 is a perspective view of the lock bolt and socket.

Figure 6 is a detail section of the method of hinging the lock plate taken on the line 6—6 of Figure 2.

Figure 7 is a top plan view of the lock plate.

Figure 8 is a like view of the gear case cover.

Figure 9 is a section on the line 9—9 of Figure 8.

Figure 10 is a section of the lock barrel device and mounting.

Figure 11 is a section and Fig. 11ª a plan of the barrel ferrule.

Referring to the illustrated embodiment, the gear case cover 1 is provided, which cover is threaded to screw down over the gear case of a Ford steering wheel mechanism.

A driven pin 2 holds this cover against being unscrewed which screw is available when the lock plate is thrown open, as will be described.

On the gear case, which is formed with a bead 3 around its upper edge, is crimped a cover plate 4. This plate engages on the gear case by the flange 3ª crimped under the bead 3. Also a filler plate 5 is provided which fits into a portion of the cover plate which projects beyond the circular gear case cover. This plate is crescent-shaped and engages under the bead on the case cover and is crimped inside the curled edge of the flange on the cover plate, as at 5ᵃ.

The cover plate 4 is slotted at the top of the gear case cover, leaving a space for the hinged link and bolt engaging pocket, and the filler plate 5 closes off the bottom of the protruding portion 4ᵃ of said cover plate. When the cover plate or lock plate is open, the pin 2 may be driven in place by a tool inserted through the lock bolt slot 12 to be hereinafter referred to.

The top of the cover plate is formed with a slot 7 of just the width to give clearance to a link 8. The link 8 is thrust through the slot in assembling the device and the pin 9 is set into the hole 10 of the link, thereby holding the link to the cover plate without riveting. This is done before crimping over the flange on the cover plate.

The portion 4ᵃ of the cover plate is formed with a circular depression 11 at the bottom of which is a key slot 12, through which the bolt head is passed and then turned at right angles, when the device is locked in use.

The lock plate is formed preferably of a single piece of steel having a dome-shaped central portion 13 to clear the hub and mounting nut of the steering wheel 14, and with two downwardly curved, wide lips 15, which in the standard steering wheel will lie between the spokes of the wheel closely adjacent to the hub and take up practically all the space between the spokes at this point (Figure 1).

This lock plate has a depending portion 16 with a central slot 17 therein, and with lateral depending flanges 18. The link 8 is thrust into the slot and the pin 19 laid under the depressed portion and thrust through a hole in the end of the link. The depending portion is then curled or crimped under the pin, thereby holding it in place without riveting. The flanges or lips 18 preventing access to the ends of the pin to drive it out.

This structure hinges the lock plate so that it can be swung back and dropped entirely out of the way of the steering wheel, as indicated in dotted lines at A in Figure 4.

The opposite end of the lock plate to the hinged end is formed with a deep cylindrical cup 20 having a curved bottom 21 which when the plate is closed will fit into the circular depression in the cover plate, thus providing a rounded bearing of great strength.

Into the bottom of the cup 20 is dropped the lock bolt which is made of a single piece of hardened steel having a head 22 similar to a screw head having a rounded base 23 which forms a bearing in the bottom of the cup.

The cylindrical shank 24 of the bolt extends through the slot 25 in the base of the cup-shaped portion 21, which slot is at right angles to the slot 12. The T-head 26 of the bolt is adapted to extend through the slot 12, so that when the bolt is turned a quarter turn, the head will engage the walls of the slot 12.

After the bolt is dropped in place, the lock barrel 27 is assembled with a hard steel ferrule 28ᵃ which is driven into the cylindrical cup 20 with the operating tongue 28 of the lock extending into the slot in the screw-like head of the locking bolt. The screw-like head of the ferrule cup will come below the edge of the cup-shaped hole, so that it cannot be pried out of said hole. The lock barrel may thus be a die casting and all strains in inserting it and danger of breakage are avoided.

As so constructed the lock is complete. In mounting it on a Ford car, the usual gear case cap is removed and the special gear case cap, together with its crimped-on cover, is screwed on in place of the removed cap. The steel pin 2 is then driven home and the lock is ready for use.

In locking the device, the wheel is brought to a position where the locking cap can be swung up between two of the spokes, and it is then swung up and dropped over the hub of the wheel and the lock bolt is turned to form a positive lock with the cover plate.

There is thus a four point interception between the spokes of the wheel, one at the hinge, one at the lock barrel and bolt mounting cup and the two others at the depending lips.

Having thus described my invention, what I claim as new and desire to secure by Letters Patent, is:—

1. In a steering wheel lock, the combination of means secured on the steering column of an automobile, adjacent the steering wheel, and a hinged plate on said means adapted to swing up through the spokes of the wheel and down over the center of the wheel, and a lock for the non-hinged end of the plate adapted to lock it to the steering column, said plate having means for engaging between the wheel spokes in addition to the hinge and lock connections.

2. In a steering wheel lock, the combination of means secured on the steering column of an automobile, adjacent the steering wheel, and a hinged plate on said means adapted to swing up through the spokes of the wheel and down over the center of the wheel, and a lock for the non-hinged end of the plate adapted to lock it to the steering column, said plate having means for engaging between the wheel spokes in addition to the hinge and lock connections, said means comprising lips turned down from the said plate and occupying largely the space between adjacent spokes close to the hub of the wheel.

3. In a steering wheel lock, the combination of means secured on the steering column of an automobile, adjacent the steering wheel, and a hinged plate on said means adapted to swing up through the spokes of the wheel and down over the center of the wheel, and a lock for the non-hinged end of the plate adapted to lock it to the steering column, said plate having means for engaging between the wheel spokes in addition to the hinge and lock connections, said plate having a closed top to lie over the wheel hub.

4. In a steering wheel lock, the combination of means secured on the steering column of an automobile, adjacent the steering wheel, and a hinged plate on said means adapted to swing up through the spokes of the wheel and down over the center of the wheel, and a lock for the non-hinged end of the plate adapted to lock it to the steering column, said plate having means for engaging between the wheel spokes in addition to the hinge and lock connections, said means comprising lips turned down from the said plate and occupying largely the space between adjacent spokes close to the hub of the wheel, said plate having a closed top to lie over the hub of the wheel, said lips extending in a unitary manner from said top.

5. In a steering wheel lock, the combination with a steering column and a steering wheel thereon, of means mounted on the column and constituting a hinge, a locking member connected to said hinge and adapted to swing into position of engagement with the steering wheel to hold it against turning and a lock for the locking member comprising an element on the steering column and an element on the locking member having socketed engagement with each other, and a revoluble bolt controlled by a key, said bolt being located within one of said elements and projecting through a slot in the the other element, said two elements being formed as concavities, so as to have a rounded engagement and the bolt having a head with a rounded seat to engage in the one concavity.

6. In a steering wheel lock, the combination with a steering column and a steering wheel thereon, of means mounted on the column and constituting a hinge, a locking member connected to said hinge and adapted to swing into position of engagement with the steering wheel to hold it against turning and a lock for the locking member comprising an element on the steering column and an element on the locking member having socketed engagement with each other, and a revoluble bolt controlled by a key, said bolt being located within one of said elements and projecting through a slot in the other element, said two elements being formed as concavities, so as to have a rounded engagement and the bolt having a head with a rounded seat to engage in the one concavity, a rounded shank and a T-head, said shank being adapted to extend through suitable slots in the two concavities.

7. In a steering wheel lock, a gear case cover, a cover plate crimped onto the gear case cover, a link mounted in the cover plate, a lock plate pivotally connected to said link, and a lock between the cover plate and the lock plate, said parts located so that the lock plate will swing up and over the hub of a steering wheel and be locked in place in such position.

8. In a steering wheel lock, a gear case cover, means on the said cover comprising a hinge, and a lock part, a lock plate secured to said hinge, said lock plate having a complementary lock part, said lock plate hinge and lock parts so located that the lock plate will swing up and over the hub of a steering wheel and be locked in place in such position.

9. In a steering wheel lock, a gear case cover, a link, means for pivoting the link on the gear case cover, a lock plate pivoted to said link and a lock part on the gear case cover and on the lock plate, said parts so located that the lock plate will swing up and over the hub of a steering wheel and be locked in place in such position.

10. In a steering wheel lock, a gear case cover, a link, means for pivoting the link on the gear case cover, a lock plate pivoted to said link and a lock part on the gear case cover and on the lock plate, said parts so located that the lock plate will swing up and over the hub of a steering wheel and be locked in place in such position, the pivots for the link comprising pins engaging holes in the link, one of said pins being housed within a part on the gear case cover, and the other being housed within the lock plate, whereby riveting of the pins is avoided.

11. A lock for devices of the character described, comprising a fixed member and a movable member, the fixed member having a rounded depression therein provided with a slot, the movable member having a cylindrical cup therein having a rounded bottom to engage in the rounded depression, a bolt having a head of rounded nature seated in the base of the cup and having its shank and head projecting therethrough for engagement in the slot of the depression, and a lock barrel having a member engaging said head, said lock barrel being mounted in said cup.

12. A lock for devices of the character described, comprising a fixed member and a movable member, the fixed member having a rounded depression therein provided with a slot, the movable member having a cylindrical cup therein having a rounded bottom to engage in the rounded depression, a bolt having a head of rounded nature seated in the base of the cup and having its shank and head projecting therethrough for engagement in the slot of the depression, and a lock barrel having a member engaging said head, said lock barrel being mounted in said cup by means of a ferrule cup having a hole in it allowing the slotted key portion of the barrel to extend through it, so that the key can be revolved, and terminating short of the upper edge of the cup.

13. In a steering wheel lock, a gear case cover, means on the said cover comprising a hinge, and a lock part, a lock plate of a single piece secured to said hinge, said lock plate having a complementary lock part, said lock plate hinge and lock parts so located that the lock plate will swing up and over the hub of a steering wheel so as to straddle the said hub and be locked in place in such position, said complementary lock part comprising a key-controlled element and a bolt housed irremovably within the lock plate.

14. In a steering wheel lock, a gear case cover, means on the said cover comprising a hinge, and a lock part, a lock plate secured to said hinge, said lock plate having a complementary lock part, said lock plate hinge and lock parts so located that the lock plate will swing up and over the hub of a steering wheel and be locked in place in such position, said complementary lock part comprising a lock barrel and lock, and a socketed member forming part of the lock plate within which said barrel is housed.

SOLOMON WISE.